(12) United States Patent
Heliot et al.

(10) Patent No.: US 9,171,248 B2
(45) Date of Patent: Oct. 27, 2015

(54) ELECTRONIC CIRCUIT WITH NEUROMORPHIC ARCHITECTURE

(75) Inventors: Rodolphe Heliot, Grenoble (FR); Marc Belleville, Saint-Egreve (FR); Sigrid Thomas, Saint Martin D'Heres (FR)

(73) Assignee: Commissariat A L'Energie Atomique et Aux Energies Alternatives, Paris (FR)

( * ) Notice: Subject to any disclaimer, the term of this patent is extended or adjusted under 35 U.S.C. 154(b) by 263 days.

(21) Appl. No.: 13/991,872

(22) PCT Filed: Nov. 29, 2011

(86) PCT No.: PCT/EP2011/071284
§ 371 (c)(1),
(2), (4) Date: Jun. 5, 2013

(87) PCT Pub. No.: WO2012/076366
PCT Pub. Date: Jun. 14, 2012

(65) Prior Publication Data
US 2013/0262358 A1      Oct. 3, 2013

(30) Foreign Application Priority Data
Dec. 8, 2010   (FR) ...................................... 10 60260

(51) Int. Cl.
*G06F 15/18*     (2006.01)
*G06N 3/04*      (2006.01)
*G06N 3/063*     (2006.01)

(52) U.S. Cl.
CPC . *G06N 3/04* (2013.01); *G06N 3/063* (2013.01)

(58) Field of Classification Search
USPC ........................................................... 706/27
See application file for complete search history.

(56) References Cited

U.S. PATENT DOCUMENTS

| | | | | |
|---|---|---|---|---|
| 7,249,001 | B2 * | 7/2007 | Heliot et al. | 702/189 |
| 7,274,222 | B2 * | 9/2007 | Alacoque et al. | 327/94 |
| 7,337,688 | B2 * | 3/2008 | Husistein | 74/89.42 |

(Continued)

OTHER PUBLICATIONS o VLSI network of spiking neurons with plastic fully configurable "stop-learning" synapses Giulioni, M. ; Camilleri, P. ; Dante, V. ; Badoni, D. ; Indiveri, G. ; Braun, J. ; Del Giudice, P. Electronics, Circuits and Systems, 2008. ICECS 2008. 15th IEEE International Conference on DOI: 10.1109/ICECS.2008.4674944 Pub Year: 2008 , pp. 678-681.*

(Continued)

*Primary Examiner* — Michael B Holmes
(74) *Attorney, Agent, or Firm* — Baker & Hostetler LLP

(57) ABSTRACT

Neuromorphic circuits are multi-cell networks configured to imitate the behavior of biological neural networks. A neuromorphic circuit is provided which comprises a network of neurons each identified by a neuron address in the network, each neuron being able to receive and process at least one input signal and then later emit on an output of the neuron a signal representing an event which occurs inside the neuron, and a programmable memory composed of elementary memories each associated with a respective neuron. The elementary memory, which is a memory of post-synaptic addresses and weights, comprises an activation input linked by a conductor to the output of the associated neuron to directly receive an event signal emitted by this neuron without passing through an address encoder or decoder. The post-synaptic addresses extracted from an elementary memory activated by a neuron are applied, with associated synaptic weights, as inputs to the neural network.

17 Claims, 9 Drawing Sheets

(56) References Cited

U.S. PATENT DOCUMENTS

| | | | |
|---|---|---|---|
| 7,511,989 B2* | 3/2009 | Thomas et al. | 365/154 |
| 7,622,983 B2* | 11/2009 | Thomas et al. | 327/534 |
| 7,728,603 B2* | 6/2010 | Delorme et al. | 324/537 |
| 8,390,312 B2* | 3/2013 | Rebaud et al. | 326/9 |
| 8,831,131 B2* | 9/2014 | Belleville | 375/288 |
| 8,909,577 B2* | 12/2014 | Heliot | G06N 3/02 706/33 |
| 8,954,363 B2* | 2/2015 | Heliot | G06N 3/02 341/120 |
| 8,975,938 B2* | 3/2015 | Soussan et al. | 327/308 |
| 2013/0144821 A1* | 6/2013 | Heliot | G06N 3/02 706/15 |
| 2013/0185237 A1* | 7/2013 | Heliot | G06N 3/02 706/33 |
| 2013/0262358 A1* | 10/2013 | Heliot | G06N 3/04 706/27 |

OTHER PUBLICATIONS

Liquid State Machine With Dendritically Enhanced Readout for Low-Power, Neuromorphic VLSI Implementations Roy, S.; Banerjee, A.; Basu, A. Biomedical Circuits and Systems, IEEE Transactions on Year: 2014, vol. 8, Issue: 5 pp. 681-695, DOI: 10.1109/TBCAS.2014.2362969 Referenced in: IEEE Journals & Magazines.*

Improved margin multi-class classification using dendritic neurons with morphological learning Hussain, S.; Shih-Chii Liu; Basu, A. Circuits and Systems (ISCAS), 2014 IEEE International Symposium on Year: 2014 pp. 2640-2643, DOI: 10.1109/ISCAS.2014.6865715 Referenced in: IEEE Conference Publications.*

An Event-Based Neural Network Architecture With an Asynchronous Programmable Synaptic Memory Moradi, S.; Indiveri, G. Biomedical Circuits and Systems, IEEE Transactions on Year: 2014, vol. 8, Issue: 1 pp. 98-107, DOI: 10.1109/TBCAS.2013.2255873 Referenced in: IEEE Journals & Magazines.*

Routing bandwidth model for feed forward neural networks on multicore neuromorphic architectures Hasan, R.; Taha, T.M. Neural Networks (IJCNN), The 2013 International Joint Conference on Year: 2013 pp. 1-8, DOI: 10.1109/IJCNN.2013.6706775 Referenced in: IEEE Conference Publications.*

M. Giulioni, et al., "A VLSI Network of Spiking Neurons with Plastic Fully Configurable "Stop-Learning" Synapses", Proceedings of the 15th IEEE International Conference on Electronics, Circuits and Systems, Aug. 31, 2008, pp. 678-681, XP031362578.

Simeon A. Bamford, et al., "Large Developing Receptive Fields Using a Distributed and Locally Reprogrammable Address—Event Receiver", IEEE Transactions on Neural Networks, Jan. 12, 2010, pp. 286-304, vol. 21, No. 2, XP011287395.

R. Jacob Vogelstein, et al., "Dynamically Reconfigurable Silicon Array of Spiking Neurons with Conductance-Based Synapses", IEEE Transactions on Neural Networks, Jan. 2, 2007, pp. 253-265, vol. 18, No. 1, XP011152920.

Sylvain Saighi, et al., "Real-Time Multi-Board Architecture for Analog Spiking Neural Networks", Proceedings of the 2010 IEEE International Symposium on Circuits and Systems, May 30, 2010, pp. 1939-1942, XP031725266.

Jim Harkin, et al., "A Reconfigurable and Biologically Inspired Paradigm for Computation Using Network-On-Chip and Spiking Neural Networks", International Journal of Reconfigurable Computing, Jan. 2009, pp. 1-13, vol. 2009, XP055002387.

Z. Jin, "Autonomously Reconfigurable Artificial Neural Network Architecture" "Autonomously Reconfigurable Artificial Neural Network on a Chip", University of Pittsburgh, Jun. 25, 2010, pp. 54-123, XP055002306.

* cited by examiner

ELECTRONIC CIRCUIT WITH NEUROMORPHIC ARCHITECTURE

CROSS-REFERENCE TO RELATED APPLICATIONS

This application is a National Stage of International patent application PCT/EP2011/071284, filed on Nov. 29, 2011, which claims priority to foreign French patent application No. FR 1060260, filed on Dec. 8, 2010, the disclosures of which are incorporated by reference in their entirety.

FIELD OF THE INVENTION

The invention relates to neuromorphic electronic circuits.

BACKGROUND

These circuits are multi-cell networks configured so as to imitate somewhat the behavior of biological neural networks. Biological neural networks comprise elementary neurons which receive and emit information, and synapses which connect these neurons to other neurons. By analogy, neuromorphic circuits generally comprise a matrix network of elementary processing cells that will be called neurons, each identified by a respective address in the memory, and a matrix memory of as many elementary memories as there are neurons; each elementary memory is associated with a neuron and can therefore be identified by the unique address of this neuron; it contains addresses of other neurons which must receive an item of information originating from the neuron corresponding to this elementary memory.

So-called "discharge" neurons are considered in what follows. These neurons receive input signals originating from other neurons; they process them in analog form generally and produce a result. The result can be the emission of an event signal, for example a pulse at a given moment. It is this so-called "neuron discharge" pulse which serves to fetch from the elementary memory associated with the neuron not only the addresses of other neurons (target neurons or destination neurons), but also weights associated with each of these addresses. The associated weights signify that one neuron will influence one or more other neurons in a weighted manner and not in an undifferentiated manner.

The addresses of the neurons influenced by a neuron are called post-synaptic addresses; the associated weights are called synaptic weights.

For example, an analog elementary neuron can be constituted in the form of a leaky temporal integrator; its internal potential represents the algebraic sum of several potentials applied over time to its inputs by other neurons, this sum being affected by leakage currents; when the internal potential attains a certain threshold, the neuron signals this event by emitting an event signal which is a pulse of very short duration, often called a "spike". The potential then returns to a rest state, waiting for new inputs. The event signal, or spike, is used, with the address of the neuron which emitted it, to extract the content of the elementary memory associated with this address; this content consists of one or more post-synaptic addresses and their associated synaptic weights. These addresses and weights are received by a processing circuit which formulates weighted input signals and which transmits them in the guise of input signals to the neurons corresponding to the post-synaptic addresses.

In the prior art as illustrated in FIG. 1, the event signal arising from the discharge of a neuron of the matrix of neurons RN is applied to an address encoder ENC which determines the address of the neuron which generated the event and which dispatches this address on a so-called presynaptic bus $B_{pre-syn}$. The pre-synaptic bus is an address bus for the memory. This bus is managed by a controller CTRL which applies this address to the memory MEM and which gathers from the memory one or more post-synaptic addresses and the weights associated with each of them. The controller successively emits the various post-synaptic addresses on a post-synaptic addresses bus $B_{post-syn}$ which applies these addresses to an address decoder DEC associated with the matrix of neurons RN. At the same time, the controller dispatches the synaptic weights to a digital analog converter DAC which establishes analog levels as a function of each synaptic weight. An analog signal level assigned a determined synaptic weight is therefore applied to each of the post-synaptic neurons identified by the content of the elementary memory which has been activated by the event signal.

Even if the events are spaced over time, that is to say even if the mean frequency of discharge of the neurons is considerably less than the speed of processing of the events by the controller, there is possible saturation of the controller, the encoders and the decoders, because of the large number of neurons of the matrix. Moreover these circuits are bulky and they consume a great deal of energy.

SUMMARY OF THE INVENTION

The aim of the invention is to improve the architecture and the operation of neuromorphic networks.

Accordingly there is proposed a neuromorphic circuit comprising
  a network of discharge neurons, each identified by a neuron address in the network, each neuron being able to receive and process at least one input signal and then later emit on an output of the neuron a signal representing an event which occurs inside the neuron,
  a programmable memory composed of elementary memories each associated with a respective neuron, the elementary memory associated with a neuron comprising a datum, this datum comprising one or more addresses of neurons and a respective weight associated with each address,
  means for extracting from the memory the datum relating to a neuron, after this neuron has emitted an event signal representing a result of the activity of the neuron,
  and a processing circuit for applying to the input of the neurons identified by the addresses contained in the datum a respective signal assigned the weight associated with this address in the datum,
  characterized in that the elementary memory comprises an activation input linked directly to the output of the associated neuron for directly receiving an event signal emitted by this neuron, a logic circuit for triggering the extraction of the datum after reception of the event signal, and outputs linked to a bus termed a post-synaptic bus for transmitting the datum on this bus, destined for the processing circuit.

This eliminates the necessity for an address encoder and for a controller to manage access to the memory. The link between the neuron and the elementary memory for signaling an event associated therewith is a direct connection which passes neither through an address encoder nor through an address decoder.

Each elementary memory is provided with means (management circuits) for managing the reading of the data that it contains and for managing notably the conflicts on the post-synaptic bus; more precisely, the management circuits prevent the writing of data to the bus while a datum arising from another elementary memory is being emitted on the bus.

Physically, the elementary memory is juxtaposed with the associated neuron in the neuron network. Having regard to the integration possibilities for circuits in three dimensions, the elementary memory will preferably be placed above (or below; above and below having a purely conventional sense here) the associated neuron. The preferred solution is to place the neural network on a first integrated circuit and the memory on a second integrated circuit placed above the first, the elementary memory being linked to the associated neuron by a respective contact (one per neuron) between the two integrated circuits.

The elementary memory preferably comprises several memory registers, each register containing an address and an associated weight; means are preferably designed to apply to the post-synaptic bus successively the various addresses and associated weights corresponding to the various registers. The management circuits of the elementary memory manage the conflicts on the post-synaptic bus so that a single register of a single elementary memory is read at a given moment.

In a solution, a first register of the elementary memory receives the event signal arising from the associated neuron so as to apply the content of this first register to the post-synaptic bus; this register (or the associated management circuit) produces a read signal which is itself applied to a second register in the guise of event signal, the second register thereafter emitting a read signal destined for the next register and so on and so forth until the last register of the elementary memory.

It will be seen that provision may be made for the memory to comprise means for assigning a variable and programmable number of registers to a neuron.

Notably, provision may advantageously be made for the registers of a column of elementary memories corresponding to a column of associated neurons to be connected in cascade in such a way that an arbitrary register of an elementary memory associated with a neuron can receive an event signal from a register situated immediately upstream even if this register situated upstream does not form part of the same elementary memory associated with the neuron. An arbitrary register can be controlled by a programmable selection circuit (or multiplexer) associated with this register so as to receive either an event signal arising directly from a neuron associated with the elementary memory corresponding to this register, or an event signal arising from the reading of a previous register corresponding to the same elementary memory, or else an event signal arising from the reading of a previous register corresponding to another elementary memory linked to another neuron.

BRIEF DESCRIPTION OF THE DRAWINGS

Other characteristics and advantages of the invention will become apparent on reading the detailed description which follows and which is given with reference to the appended drawings in which.

DETAILED DESCRIPTION

Figure 1:
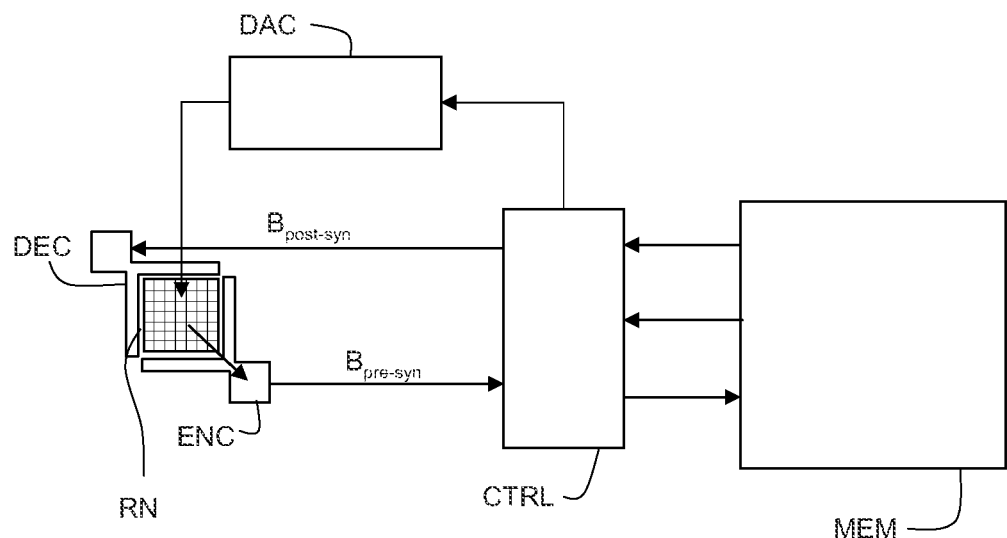
FIG. 1 already described represents the structure of a neural network of the prior art.
Figure 2:
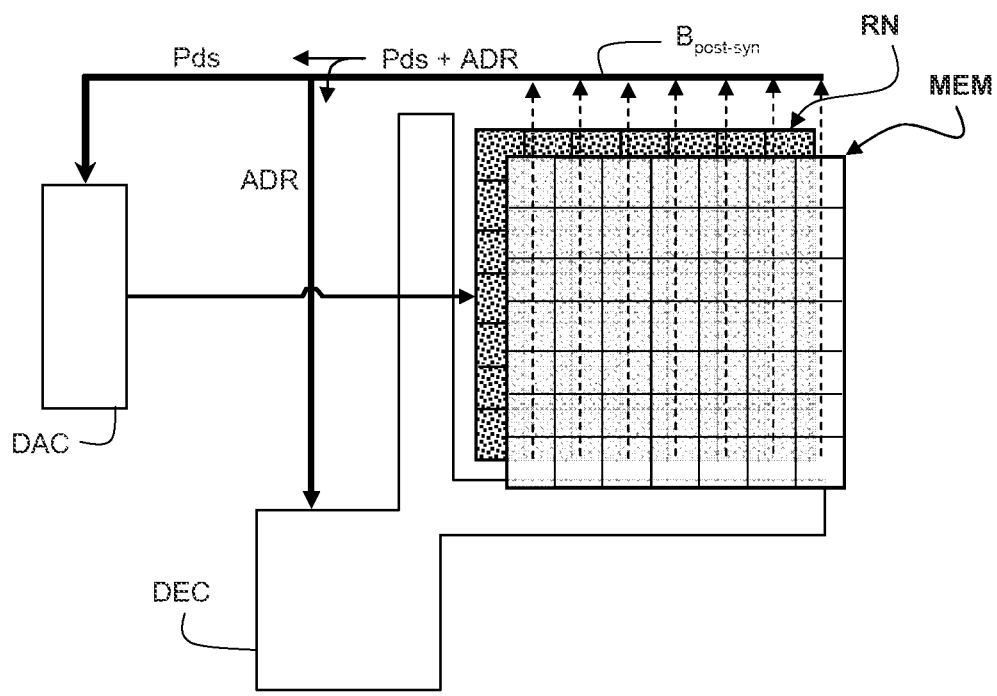
FIG. 2 represents the basic architecture of a neuromorphic circuit according to the invention.

The general architecture of the neuromorphic circuit according to the invention is represented in FIG. 2. It comprises a matrix network RN of neurons arranged in rows and columns. Each neuron is identified by its row-wise and column-wise address, and it comprises an elementary circuit having inputs and an output. The network RN is represented in FIG. 2 by a gridded square on a speckled background.

A programmable memory MEM is associated with the matrix of neurons and each element of this memory is associated with a respective neuron. The memory MEM is represented in FIG. 2 by a gridded square with the same spacing as the neural network and superimposed in perspective and in partial transparency above the neural network. This representation is symbolic so as to show not only the correspondence between a memory element and an associated neuron, but also to show that the memory can be disposed physically above or below the neural network and that each element of the memory can be linked directly to an associated neuron situated just above or below.

The memory element associated with a neuron will be called an elementary memory hereinafter; the elementary memory therefore comprises an activation input linked directly by a respective conductor to the output of the associated neuron, so that when the neuron emits an event signal, this signal activates the elementary memory and authorizes the extraction of the data contained therein. These data are the addresses of the post-synaptic neurons which must receive an item of information during the event signaled by the neuron considered, and the synaptic weights associated with each of these addresses (a synaptic weight Pds per post-synaptic address ADR). The data read from the elementary memory during its activation are dispatched from the memory to a post-synaptic bus $B_{post-syn}$.

The synaptic weights transported by the bus are applied to a digital-analog converter DAC (in the general case where the neurons are analog elementary circuits, but they could conceivably also be purely digital). The addresses transported by the post-synaptic bus are applied to an address decoder DEC able to select row-wise and column-wise a determined neuron. The neuron selected at a given moment by a post-synaptic address receives on its input a voltage or a current produced at this moment by the converter DAC, corresponding to the synaptic weight associated with this address on the bus.

A neuron which has received one or more input signals can emit after a certain time an event signal indicating the result of a state that it has attained at this moment having regard to the input signals received. This signal directly triggers, without passing through an address encoder or through a controller, the activation of the elementary memory corresponding to this neuron. This activation triggers the emission of one or more post-synaptic addresses and the synaptic weights associated with each of these addresses.

There is therefore now a direct link between the output of each neuron and an activation input for an elementary memory associated with this neuron. The elementary memory is situated preferably above (or below, which amounts to the same) each neuron as is represented in FIG. 2, but it could also be situated alongside each neuron. In the case where it is situated above, provision may be made to use a technology of integrated circuit stacks, with a connection of the TSV type (standing for "Through Silicon Vias") for each elementary memory, that is to say a contact through the thickness of the chip between an elementary memory integrated onto the surface of a chip and a neuron situated on the surface of another chip. The geometry of the network is in this case organized (as represented in FIG. 2) with the same pitch spacing for the memory and the neural network, both row-wise and column-wise. If an elementary memory occupies a much more sizeable area than a neuron, it may be desirable to divide the memory into several superimposed planes each containing a part of the memory, but ever with a direct link (even if it is through the thickness of several chips) between a neuron and an elementary memory.

The address and weights data contained in an elementary memory are preferably transmitted to the post-synaptic bus by way of column conductors, that is to say, for each memory column, at least one conductor links all the elementary memories of the column. The column conductors are symbolized by dashed arrows in FIG. 2. Only one conductor per column has been represented, but in practice this conductor is a bus of several conductors if the data of an elementary memory are dispatched in parallel and not in series to the post-synaptic bus. A circuit, not represented, for managing conflicts can be designed to prevent data originating from two different columns from attempting to board the post-synaptic bus at the same time.

Moreover, an electronic management circuit of the elementary memory is preferably contained in each elementary memory; it serves to prevent several elementary memories of one and the same column from simultaneously transmitting their content on the column conductor. The management of conflicts of this type will be returned to further on. It is this circuit which receives the event signal arising from the associated neuron and which determines the moment at which the item of information must be extracted from the elementary memory.

The memory MEM is programmable if it is desired that the neuromorphic circuit be adaptable to any configuration of synaptic links between neurons.

For the programming of the memory, use is made of row address and column address decoders, which have not been represented in FIG. 2 so as not to overload the representation (the decoder DEC of FIG. 2 is the neuron address decoder, not an address decoder of the memory). The row decoders designate a row of elementary memories to which it is desired to write data, and the column decoders make it possible to apply the desired data to each elementary memory of this row, by passing through the column conductors mentioned hereinabove.

In practice, as will be seen, each elementary memory is subdivided into several separately addressable registers, each register containing a post-synaptic address and an associated synaptic weight. A respective management circuit is then associated with each register in the elementary memory.

Figure 3:
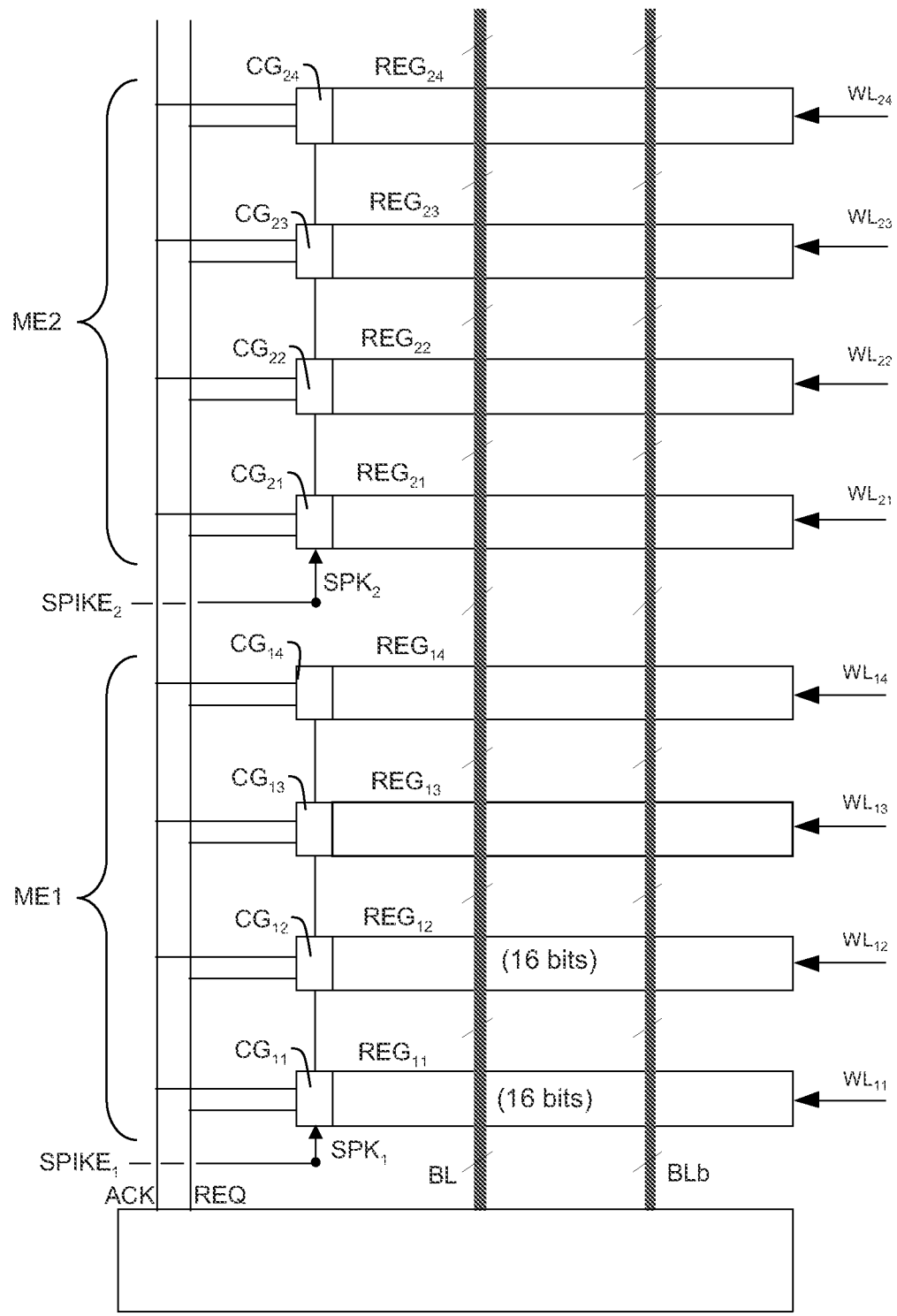
FIG. 3 represents a memory organization of the neuromorphic circuit according to the invention.

FIG. 3 represents a construction of the elementary memories which makes it possible to implement the architecture of FIG. 2, that is to say which makes it possible to operate with an elementary memory linked directly to an associated neuron and which makes it possible to extract the information of the memory to a post-synaptic bus by way of column conductors.

In this example, the elementary memory is composed of four memory registers each intended to contain a post-synaptic address and an associated synaptic weight. Each neuron can thus influence between zero and four other neurons. The number four is taken by way of example and could be another number. The contents of the registers are extracted one after the other during the activation of the elementary memory by the associated neuron.

Two elementary memories ME1 and ME2, belonging to one and the same column, are represented; they are associated with two different neurons of the network RN. The other columns are not represented. Each of the four registers of an elementary memory can provide its content on a column bus; the latter links all the registers of all the elementary memories of the column. The registers are designated by $REG_{11}$ to $REG_{14}$ for the memory ME1, and by $REG_{21}$ to $REG_{24}$ for the memory ME2. In this example the bus comprises 32 conductors, serving to transmit 16-bit words representing the content of a register. Each information bit is here transmitted on two conductors so as to transmit the real value of the bit and also its complement; this provision is related to the fact that the memory is preferably of SRAM type. The bits are transmitted on a 16-bit bus BL, their complements on a 16-bit bus BLb. Other organizations are possible, including organizations in which the bits are transmitted in series rather than in parallel.

Moreover, two additional column conductors are envisaged for the management of conflicts, in order to prevent several registers from simultaneously providing their content on the buses BL and BLb. One of the additional conductors, designated by REQ, is intended to transmit a query on the part of a register (query to request authorization to provide data on the buses). The other, ACK, is intended to transmit an acknowledgment signal terminating an extraction of data from a register. These two conductors are linked to a conflict management circuit associated with each of the registers. This management circuit is represented schematically by a small block $CG_{11}$ to $CG_{14}$ and $CG_{21}$ to $CG_{24}$ on the left of the respective register. This management circuit comprises two inputs which are respectively a neural event signal input and an acknowledgment input (linked to the acknowledgment conductor ACK), and two outputs which are a query output (in fact a query input/output linked to the query conductor REQ) and another output that will be called the read signal output.

The elementary memory ME1 comprises an activation input $SPK_1$ linked directly to a neuron so as to receive therefrom an event signal $SPIKE_1$. The elementary memory ME2 comprises an activation input $SPK_2$ linked directly to another neuron so as to receive therefrom an event signal $SPIKE_2$. The signals $SPIKE_1$ and $SPIKE_2$ are applied to the event signal input of the management circuit of the first register of each memory, i.e. respectively the register $REG_{11}$ of the memory ME1 and the register $REG_{21}$ of the memory ME2. The signal received on the event input of a register triggers the reading of this register.

The management circuits of the successive registers $REG_{11}$ to $REG_{14}$ of one and the same elementary memory ME1 (and the same holds for ME2) are linked in cascade by the read signal output of a management circuit which enters on the event signal input of the next. The read signal arising from the management circuit of a register will therefore be considered to be an event signal (as if it originated from a neuron) by the next register. Thus, the read signal output of the circuit $CG_{11}$ is linked to the event signal input of the management circuit $CG_{12}$ and so on and so forth up to the circuit $CG_{14}$, so that these registers can be read one after the other after an event signal has been emitted by a neuron on the event input of this elementary memory.

This process of successive reading will be returned to further on.

Further represented in FIG. 3 are word lines $WL_{11}$ to $WL_{24}$ making it possible to address row-wise each register of the elementary memories. There are as many word lines as there are registers in the column, therefore here four times as many word lines as elementary memories in a column (therefore of neurons in a column). By using the bit line buses BL and BLb to define the contents of the registers and the word lines to designate each register, it is possible to program all the registers of the memory at will. A word line serves of course to simultaneously address the registers of the various columns of the memory that are situated in one and the same row of the memory, for a write or readout of these registers.

Figure 4:
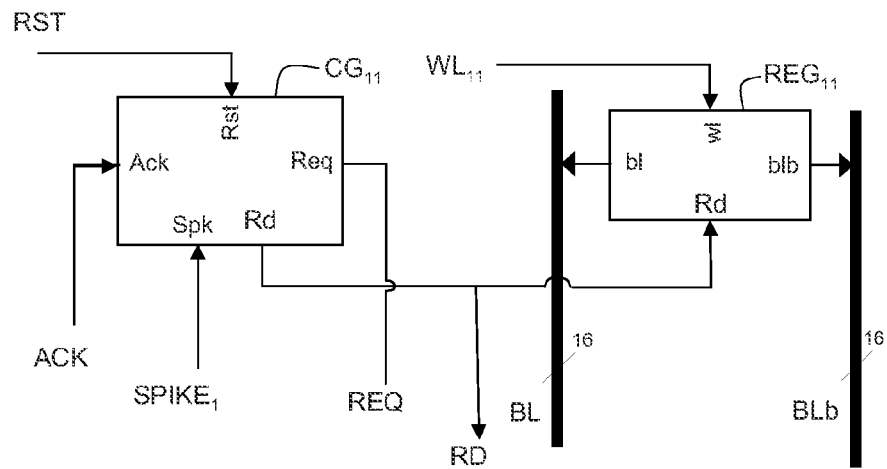
FIG. 4 represents the construction of an elementary memory register with a respective management circuit for this register.

FIG. 4 represents the general architecture of a memory register with its respective management circuit, whether this register be a first register (such as $REG_{11}$ or $REG_{21}$) of the elementary memory, or another register (such as $REG_{12}$ $REG_{13}$, $REG_{14}$) of this memory. It is assumed here that it is the register $REG_{11}$ of FIG. 3, with its management circuit $CG_{11}$.

The memory register proper, comprising for example 16 elementary memory points, is linked to the bit lines which are 16-bit buses BL and BLb each grouping together the elementary bit lines of the 16 points. It is controlled by the word line $WL_{11}$ in the memory programming or readout phase. And it moreover possesses a reading activation input Rd, this input making it possible to read the content of the register during the operation of the neuromorphic circuit (that is to say outside of the memory programming phase).

The management circuit $CG_{11}$ associated with the register $REG_{11}$ comprises an input Spk which is intended to receive an event signal $SPIKE_1$ and to store this signal; for the first register of the elementary memory, this input Spk constitutes at the same time the input $SPK_1$ of the elementary memory; for the other registers, the input Spk receives an output of a management circuit situated upstream. The circuit $CG_{11}$ also comprises an input/output Req linked to the line REQ (query line) and an input Ack linked to the line ACK (acknowledgment line); a second output Rd produces the read signal RD intended for the associated register $REG_{11}$ so as to authorize the reading of this register.

The output Rd of the management circuit $CG_{11}$ is moreover linked to the input Spk of the management circuit of the register situated immediately downstream in the column-wise organization of the registers. Consequently, the production of a signal RD by the circuit $CG_{11}$ in response to the event signal of a neuron triggers not only the reading of the register $REG_{11}$ but also triggers, on the output Rd, the equivalent of an event signal for the input Spk of the control circuit $CG_{12}$ of the register situated immediately downstream. And so on and so forth, each control circuit generates at one and the same time on its output Rd a read signal for its associated register and an event signal in respect of the management circuit of the register situated immediately downstream, doing so up to the last register of the elementary memory.

In the process for reading the content of the various registers of an elementary memory, on receipt of an event signal $SPIKE_1$, the management circuit $CG_{11}$ executes the following operations:

storage of the event represented by the signal $SPIKE_1$;

emission of a query on the line REQ, if no query is currently active on this line, (or wait if a query is currently active and emission of a query when the query line is released); the query can consist of forcing the query line to the 0 logic level;

emission of a signal on the output Rd destined for the associated register and the management circuit situated immediately downstream; this results in the reading of the first register and the storing of an event in the next register;

reception of an acknowledgment signal on the input Ack and releasing of the query line so that the management circuit of the next register can emit a query and that this next register can provide its data.

The query line is released on receipt by the management circuit of an acknowledgment signal originating from the line ACK. This signal is produced outside the memory by a control circuit of the post-synaptic bus, which indicates that it has indeed received the data extracted from the memory.

Finally, a reset signal RST can be designed to force, for example at each power-up, the circuit into a known inactive state. This signal is applied to an input Rst of the management circuit.

Figure 5:
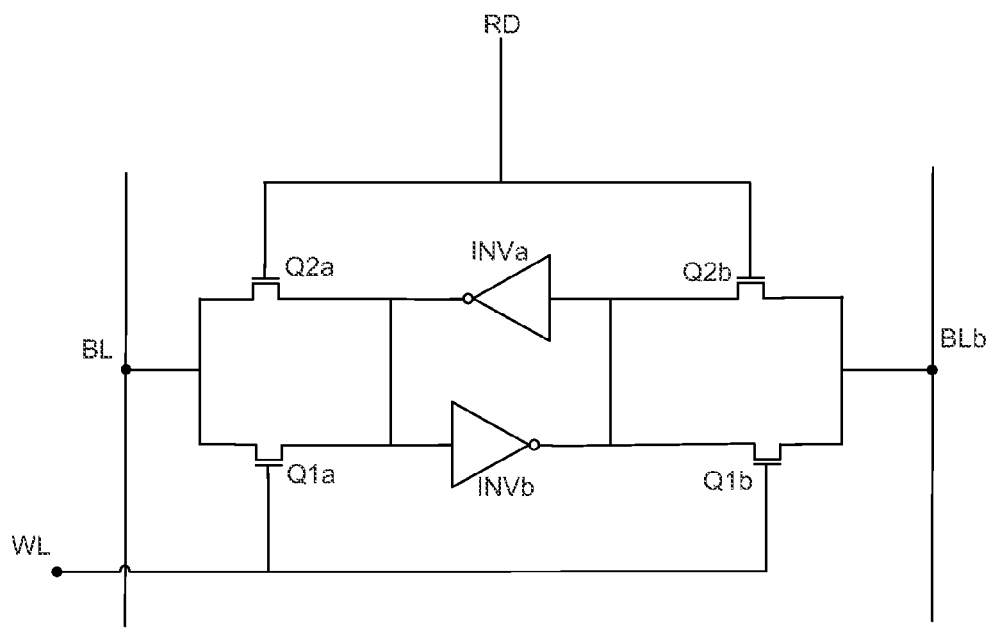
FIG. 5 represents an elementary memory point of the register.

The basic structure for storing a data bit in a register of the memory is that which is represented in FIG. 5. It is a conventional SRAM memory point with two head-to-tail inverters INVa, INVb whose outputs are linked to a bit line BL on one side, to a complementary bit line BLb on the other by way of access transistors Q1a and Q1b controlled by a word line WL. But moreover, the inputs/outputs of the inverters are also linked to the bit lines by way of two additional transistors Q2a and Q2b controlled by the read signal RD arising from the management circuit of the register.

This means that it is possible to write to the memory and read in a traditional manner, through a row decoder, by way of the word line and the transistors Q1a and Q1b, and that it is furthermore possible to read the content of the memory by way of the signal RD and the transistors Q2a and Q2b. The signal RD will be emitted either in response to an event signal SPIKE if the memory point forms part of the first register $REG_{11}$ or $REG_{21}$ of the elementary memory, or in response to the read signal RD arising from the management circuit situated immediately upstream if the memory point forms part of a register downstream of the first register.

It will be seen further on that it is possible to make do with two transistors and not four with a small steering circuit making it possible to direct toward the gate of these transistors either the word line WL (in the memory programming phase) or a signal RD generated directly or indirectly by the event signal (in the neuromorphic circuit usage phase).

Figure 6:
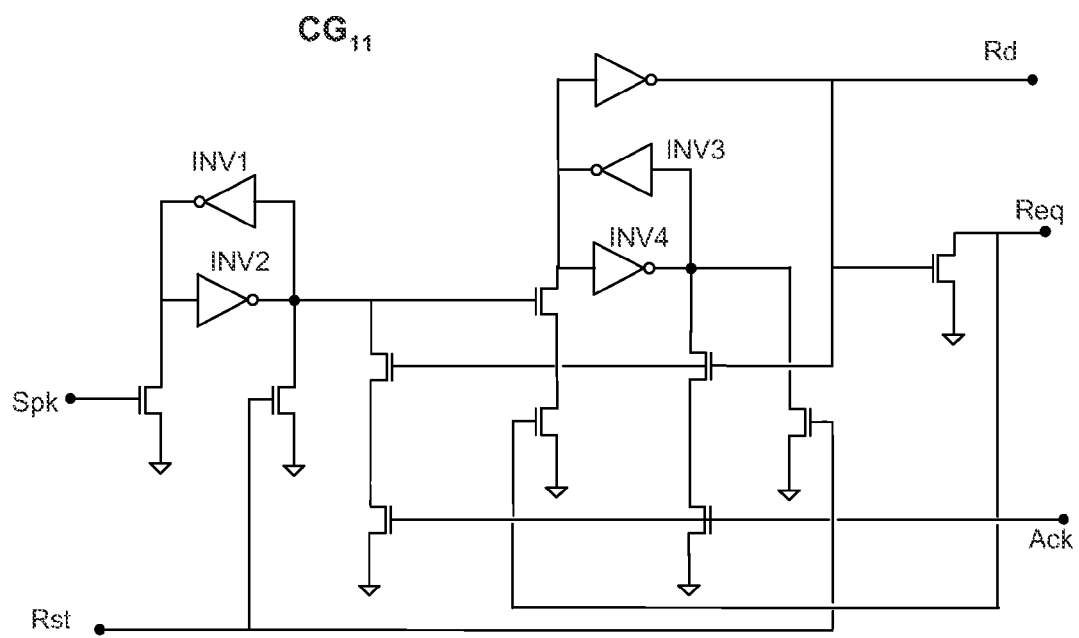
FIG. 6 represents a possible construction of the management circuit associated with a register.

FIG. 6 represents by way of example a possible embodiment of the management circuit $CG_{11}$. This circuit carries out electronically the simple functions indicated hereinabove. It comprises, linked to the input Spk, a group of two head-to-tail inverters INV1, INV2 constituting a memory point for receiving and storing the reception of the event signal $SPIKE_1$; it is the output of this memory point which authorizes the activation of the reading of the register. The pulse $SPIKE_1$ (or the read signal RD arising from another management circuit situated upstream and serving as event signal) can disappear as soon as it has been stored. At the end of the reading, this storage will be canceled by the acknowledgment signal, but it can also be canceled by a global reset signal received on the input Rst of the management circuit. The management circuit also comprises a group of two head-to-tail inverters INV3, INV4 constituting a second memory point for receiving and storing the fact that at one and the same time a pulse has been received and the query line is available; the query line (connected to the input Req) is here considered to be active at the low logic level. The activation of the second group of head-to-tail inverters forces a query on the terminal Req, which query renders it unavailable for the other registers of the same column. This forcing does not take place if the query line is already active, that is to say if there is already a query in progress in respect of another register of the same elementary memory or another elementary memory associated with another neuron.

At the same time as the query is forced on the terminal Req, the management circuit dispatches to the output Rd the read signal intended for the reading register associated with this management circuit and intended moreover for the management circuit situated immediately downstream.

Next, when the bits of the register have been read, the acknowledgment line transmits an acknowledgment signal ACK to the input Ack of the management circuit. This signal resets the two memory points of the management circuit which is currently activated. The resetting of the second memory point deactivates the output Req and renders the query line REQ available.

Figure 7:
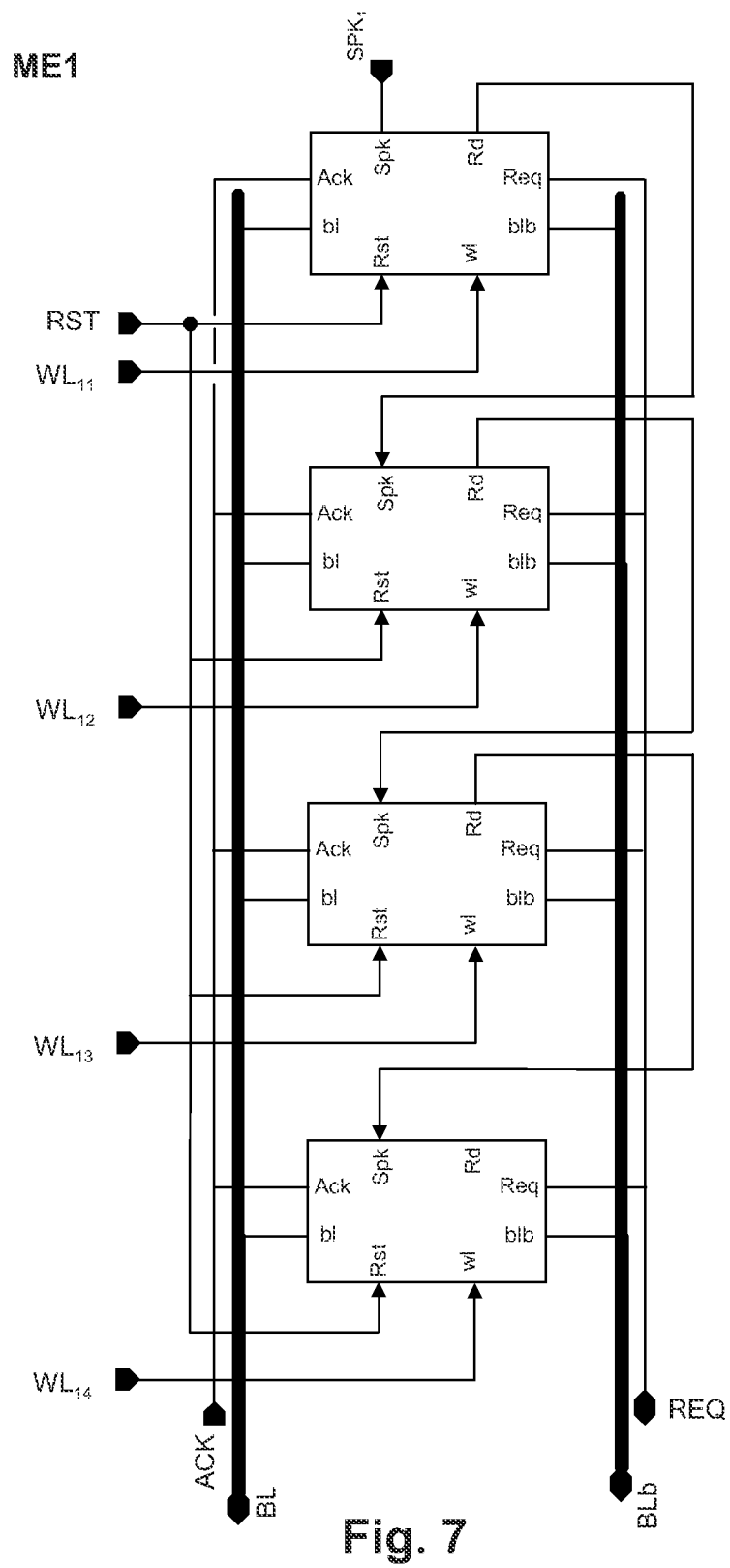
FIG. 7 is another representation of the architecture of the memory of the neuromorphic circuit according to the invention in which a register and its management circuit are represented by a single block.

FIG. 7 is another representation of the general architecture of an elementary memory such as $ME_1$; in this figure has been represented a single circuit for each word line, this circuit comprising both the management circuit and the memory register. The elementary memory comprises four identical column circuits, addressed by the word lines $WL_{11}$ to $WL_{14}$. Each of these circuits is constituted like the set represented in FIG. 4. Each circuit therefore comprises an event input Spk, a reset input Rst, a row-wise addressing input WL, an acknowledgment signal input Ack, a query input/output Req, bus outputs bl and blb of sixteen bits each (in this example), and a reading output Rd. The reading output Rd of a circuit is connected to the input Spk of the circuit situated immediately downstream. The input Spk of the first circuit of the chain constitutes the activation input $SPK_1$ of the elementary memory and receives the event signal $SPIKE_1$ of the neuron associated with this elementary memory. The output Rd of the last circuit in the chain is not connected. Represented in FIG. 7 is a reset conductor RST making it possible to globally reset all the management circuits of the column of elementary memories so as to ensure that the circuits all are quiescent at the start of the operation of the neuromorphic circuit.

Figure 8:
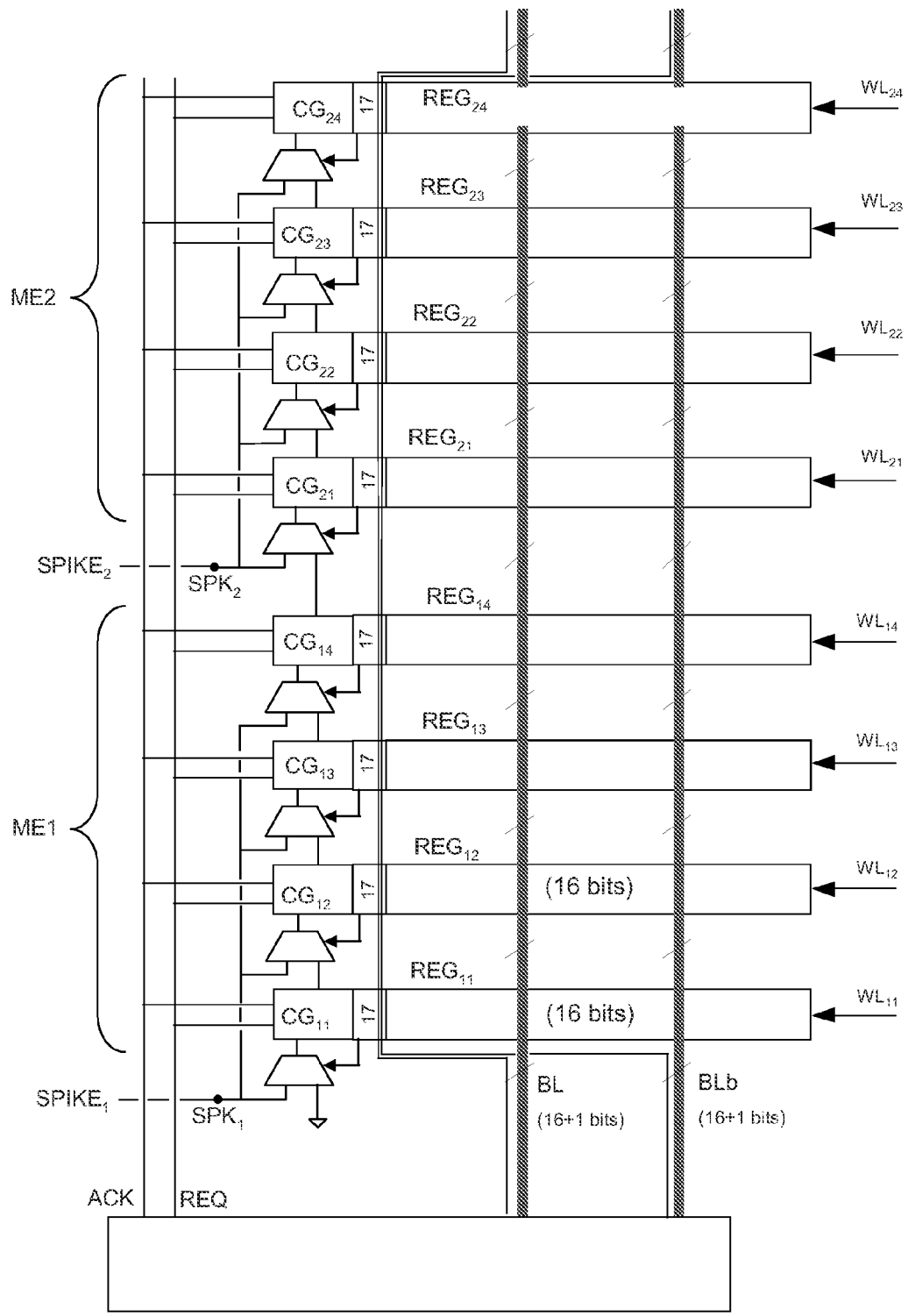
FIG. 8 represents the memory in which a small programmable selection circuit has been associated with each register, the former making it possible to determine whether the register must be associated directly with a neuron or whether it must be considered to be an additional register of an elementary memory associated with another neuron.

FIG. 8 is a variant architecture of a column of elementary memory points associated with the neurons of a column, but in which the association between a neuron and an elementary memory is in part programmable. This architecture makes it possible to associate a variable number of registers with the neuron. Indeed, certain neurons may need to trigger more post-synaptic neurons than others. Consequently, whereas the previous figures were constructed on the principle of four registers associated in a fixed manner with each neuron, FIG. 8 is constructed on the principle of the association of a variable, programmable number of registers of the column with a neuron. But of course the total number of registers is limited in a column, so that if one neuron uses more registers, other neurons associated with the column will use fewer, or none at all.

To achieve this result, each post-synaptic register comprises not only the synaptic addresses and weights associated with a neuron but also an additional bit that will be called a "configuration bit" which determines whether this register must be read-activated by an event signal arising directly from a neuron or whether it must conversely be activated in the guise of downstream register by the reading output of a register situated immediately upstream.

Consequently,
in FIG. 2 it is always the first register of a group of four registers which receives the actual event signal $SPIKE_1$ or $SPIKE_2$ arising from a neuron and this neuron can only be associated with these four registers; the fourth register is not linked to the first register of the next elementary memory;

but in FIG. 8, the four registers associated with a neuron can all receive the event signal $SPIKE_1$ (or $SPIKE_2$) arising from the neuron, and each register can optionally be considered to be the first register according to the configuration bit which is programmed in this register; the activation input $SPK_1$ of the elementary memory $MEM_1$ is therefore linked in parallel to the inputs Spk of the management circuits of the four registers of the memory; the site of the first register associated with the neuron is chosen thus and the registers which precede can be assigned to the preceding neuron; it is even possible to assign to a downstream neuron all the registers associated with a (or even several) neuron situated immediately upstream in the same column.

The management circuit therefore now comprises an event input selection circuit (or multiplexer), controlled by the configuration bit programmed in the register. It is considered here that this selection circuit forms part of the management circuit of the register, and it is therefore seen in FIG. 8 that the management circuit now comprises a multiplexer which has two event signal inputs, and an output which defines the event signal actually used; the first event signal input receives the signal SPIKE, for example $SPIKE_2$ for the circuits $CG_{21}$ to $CG_{24}$ and it is therefore connected directly to the associated neuron; the second receives a read signal arising from the management circuit situated immediately upstream. The multiplexer is controlled by the configuration bit which here is the $17^{th}$ bit programmed in the register, the first 16 bits defining the actual content of the elementary memory, that is to say an address and a synaptic weight. It will be noted that the management circuit of the first register $CG_{21}$ of the group of four registers that is associated with the neuron can itself receive either the signal $SPIKE_2$ arising from the neuron, or a read signal originating from the last register ($CG_{14}$) of a group of registers that is situated upstream in the column.

Consequently, in the case where it is an intermediate register, for example $REG_{23}$ which is programmed to receive the event signal $SPIKE_2$, the other registers of the group are programmed not to receive it. Moreover, the registers $REG_{22}$ and $REG_{21}$ situated upstream of $REG_{23}$ can then be associated with the preceding neuron (and therefore be associated with the elementary memory ME1) and in this case they are programmed so that their management circuits are arranged in cascade with the read signal arising from the last register ($REG_{14}$) associated with the memory situated upstream (MEM1). Likewise, whichever register is programmed to receive the signal $SPIKE_2$, it is possible to program the registers associated with an elementary memory situated downstream of MEM2 so that the management circuits of these registers receive, in cascade, the read signals arising from the last register $REG_{24}$ of the elementary memory MEM2.

Moreover, in the foregoing, it was considered that the memory points of the registers included two transistors Q2a and Q2b controlled by a read signal RD for the reading in neuromorphic network mode in addition to the transistors Q1a and Q2a controlled by the word line WL and which conventionally serve for the row-wise addressing of the memory point for the programming of the memory. However, provision could also be made for the memory point to comprise only two transistors, for example Q2a and Q2b, on condition that the management circuit comprise an additional logic function for steering toward these transistors either the addressing signal for the word line WL (for the programming of the memory) or, when the word line is not activated, a signal RD emitted by the management circuit of the register situated immediately upstream (for operation of the neuromorphic circuit).

A read signal RD is then established at the foot of the column and is propagated from management circuit to management circuit during the operation of the circuit. It is this signal RD which directly triggers the reading of the memory points of the register when the word line WL is not activated. When the word line is activated, it is the word line which activates reading or writing in the memory points.

Figure 9:
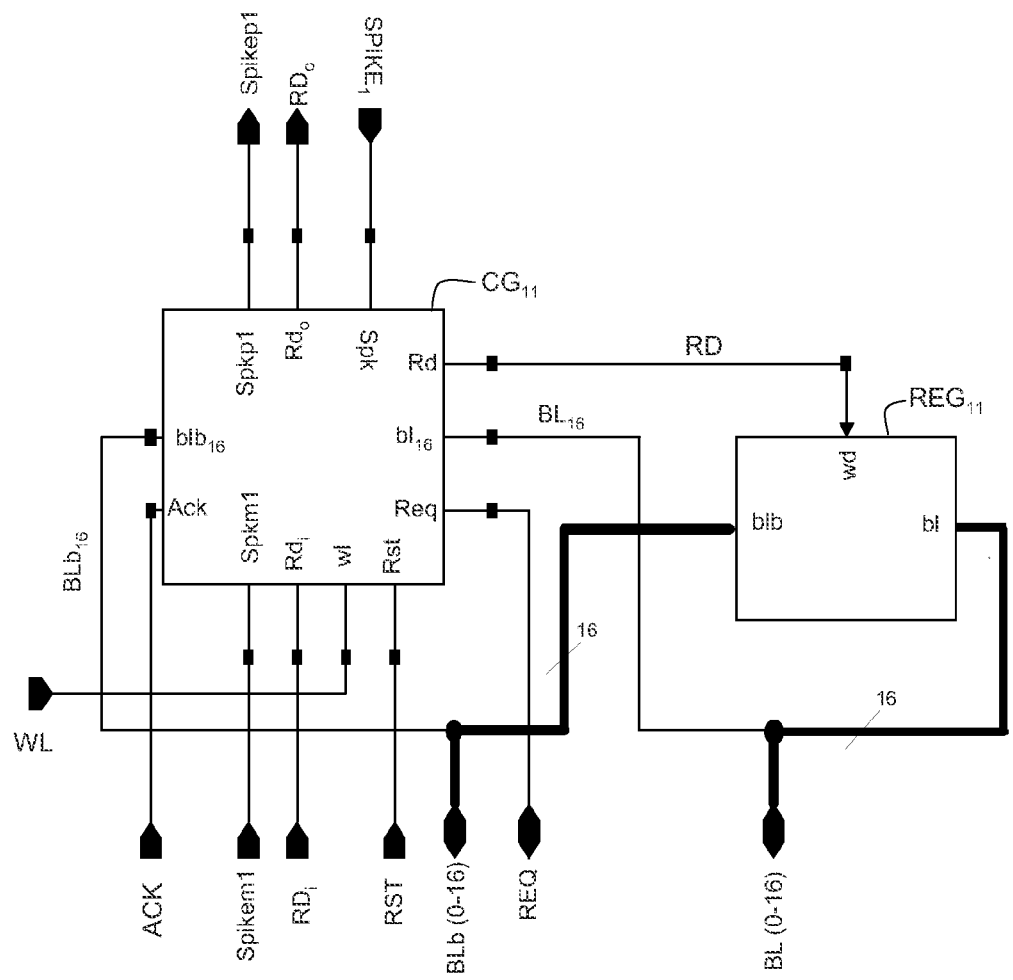
FIG. 9 represents a memory register with its associated management circuit intended to be used in the circuit of FIG. 8.

FIG. 9 represents the architecture which can result therefrom for a register, for example $REG_{11}$ and its associated management circuit $CG_{11}$ (including the multiplexer mentioned previously).

The 17-bit register $REG_{11}$ is visible on the right, the management circuit on the left. The 34 outputs of the register travel on the bit lines BL and BLb (17 lines), among which two outputs $BL_{16}$ and $BLb_{16}$ correspond to the $17^{th}$ programmable bit serving to control the management circuit; this bit and its complement are for this purpose applied to inputs $bl_{16}$ and $blb_{16}$ of the management circuit.

The register comprises an activation input wd which controls the transistors of the memory points in order to authorize reading or writing in the register. This input receives from the management circuit a signal RD which is triggered either (in neuromorphic operation mode) by an event signaled by a neuron, or (in memory programming mode) by the activation of the word line WLb associated with the line to which this register belongs.

The management circuit comprises the same inputs and outputs, acknowledgment Ack and query Req, as in FIG. 4. It also comprises a general reset input Rst. But it now comprises not a single event signal input Spk but two inputs Spk and Spkm1, the first being connected to the neuron associated with the elementary memory (for receiving $SPIKE_1$) and the other being linked to an event signal output of the management circuit of the register immediately upstream; these inputs correspond to the inputs of the previously mentioned multiplexer. The management circuit also comprises an event signal output (Spkp1) which is connected to the input Spkm1 of the downstream management circuit. It comprises inputs $bl_{16}$ and $blb_{16}$ intended to receive the $17^{th}$ bit $BL_{16}$ (configuration bit) and its complement $BLb_{16}$ serving to determine whether it is the input Spk or the input Spkm1 which must be used.

In this configuration where the memory points of the registers possess only the transistors Q2a and Q2b of FIG. 5 but not the transistors Q1a and Q1b, provision is made for the management circuit to furthermore comprise an input $Rd_i$ for receiving a read signal arising from a management circuit situated immediately upstream, an output $Rd_o$ for providing a read signal to the input $Rd_i$ of the management circuit situated downstream, an output Rd for providing a reading order to the input wd of the register (that is to say to the gates of the transistors Q2a, Q2b of the memory points of the register). Finally, the management circuit then comprises an input w1 for receiving the word line WL corresponding to the register; this input determines which signal must be provided on the output Rd for activating the register: it is either a read signal or order triggered by the signal received by the input $Rd_i$ (circuit in neuromorphic network mode), this being when WL is inactive (at the low level), or conversely an addressing order independent of the signals RD when WL is active (at the high level), when the circuit is in programming mode for this register.

The circuit therefore operates in the following manner:
in neuromorphic network programming mode, the word line WL passes successively to the high level to address each of the registers to be programmed; it remains at the low level for the others; the inputs $Rd_i$ and output $RD_o$ are not used; the output Rd of the management circuit triggers a writing order for the 17 memory points of the addressed register; the bit lines bring the item of information to be programmed into these 17 memory points;
in neuromorphic network operating mode, the word line WL is at the low level for all the registers; the management circuit receives the event information originating directly from the neuron (signal $SPIKE_1$ on the input Spk) and the event information originating from the management circuit situated immediately upstream (signal Spikem1 on the input Spkm1); it is the configuration bit programmed into the management circuit which determines which item of information will be used; the actual reading of the register which has stored an event item of information occurs when the input $Rd_i$ is activated and of course on condition that the query procedure on the query line has authorized this reading; the reading order is then emitted by the output Rd of the management circuit to the input wd of the register. The data of the register are applied to the bus BL, BLb. The management circuit subsequently emits a signal Spikep1 on the output Spkp1 and a signal $RD_o$ on the output $Rd_o$ to trigger the same process in the management circuit situated immediately downstream.

Figure 10:
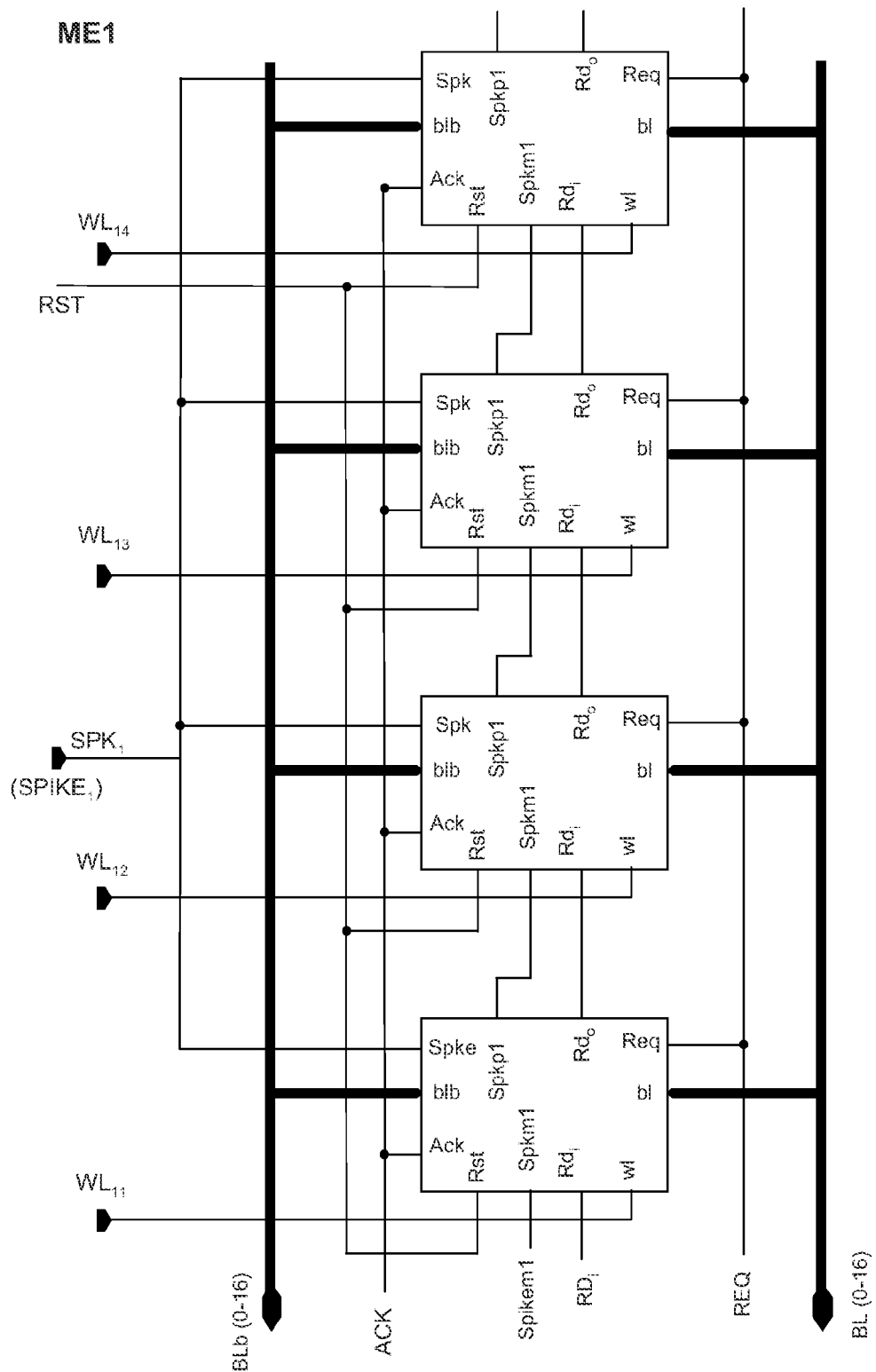
FIG. 10 represents the organization of the elementary memories with, for each row of the memory, a respective block uniting the register and the management circuit of FIG. 9.

FIG. 10 shows the configuration of the elementary memory ME1 in a representation of the same type as that of FIG. 7, that is to say with a single block assigned to each register and its associated management circuit. The cascade connection of the various blocks of one and the same elementary memory is seen therein; the connection of the last block of an elementary memory to the first block of the next elementary memory is the same as the connection inside an elementary memory.

Figure 11:
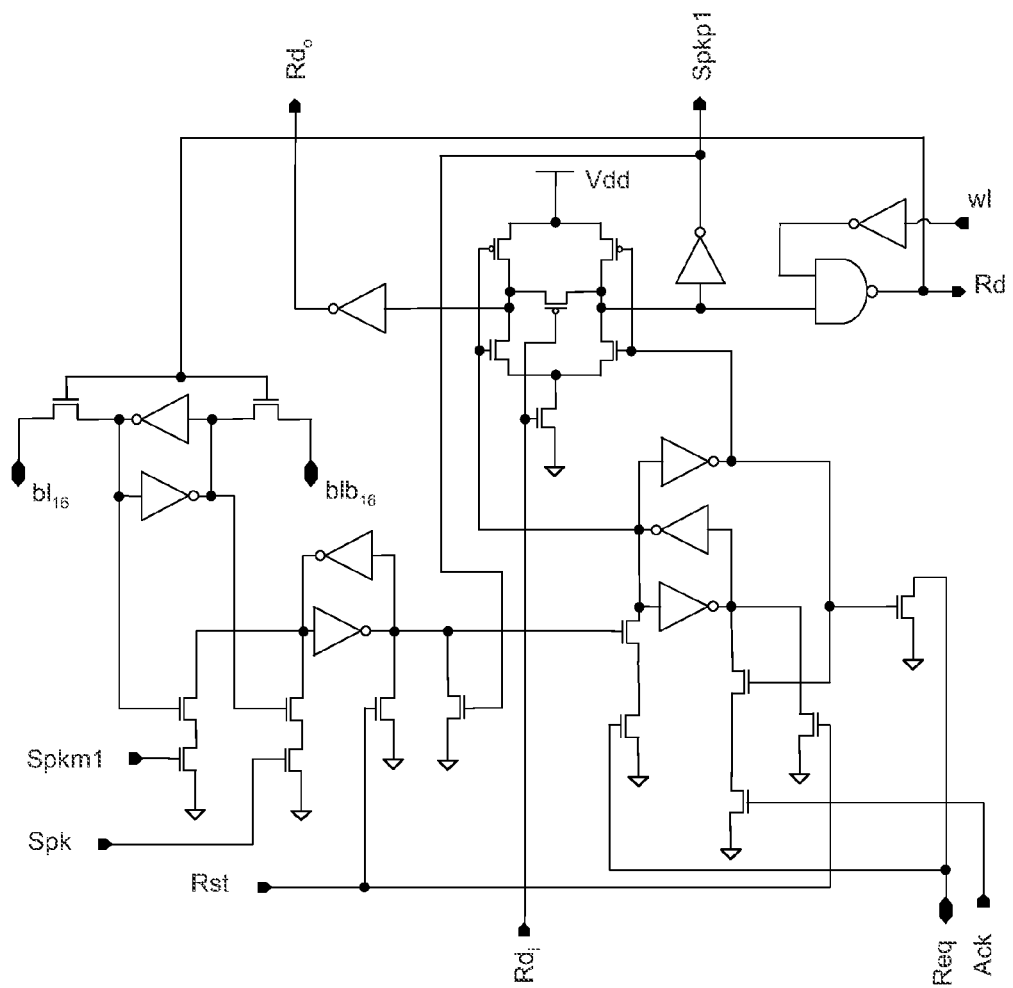
FIG. 11 represents an exemplary detailed circuit corresponding to the management circuit block of FIG. 9.

Finally, FIG. 11 shows by way of example a detailed possibility of embodiment of the management circuit explained with reference to FIG. 9.

The invention claimed is:

1. A neuromorphic circuit comprising:
a network of discharge neurons each identified by a neuron address in the network, each neuron being able to receive and process at least one input signal received on a neuron input and then later emit on an output of the neuron an event signal representing an event which occurs inside the neuron;
a programmable memory having elementary memories, each elementary memory associated with a respective neuron and comprising at least one register for memorizing a datum, the datum comprising one or more addresses of neurons and a respective weight associated with each address, and each elementary memory having a logic control circuit connected to a means for extracting the datum and configured to trigger an extraction of the datum after reception of the event signal, said logic control circuit having an activation input linked directly to the output of the respective neuron for directly receiving the event signal emitted by the respective neuron, the extraction of the datum comprising writing the datum on a post-synaptic bus; and a processing circuit for, after reception of the datum on an input connected to the post-synaptic bus, applying, to the input of a neuron that is identified by one of the one or more addresses contained in the datum, a respective input signal assigned the respective weight associated with the one of the one or more addresses in the datum.

2. The neuromorphic circuit as claimed in claim 1, wherein the logic control circuit of the elementary memory comprises a conflicts management circuit for preventing writing of data to the post-synaptic bus while a datum arising from another elementary memory is being emitted on the post-synaptic bus.

3. The neuromorphic circuit as claimed in claim 1, wherein the elementary memory is juxtaposed with the respective neuron in the network of discharge neurons.

4. The neuromorphic circuit as claimed in claim 1, wherein the elementary memory is situated above the respective neuron.

5. The neuromorphic circuit as claimed in claim 4, wherein the network of discharge neurons is situated on a first integrated circuit and the memory is situated on a second integrated circuit placed above the first, the elementary memory being linked to the respective neuron by a respective contact between the first integrated circuit and the second integrated circuit.

6. The neuromorphic circuit as claimed in claim 1, wherein the elementary memory comprises several memory registers, each memory register having the one or more addresses and the associated weights, and comprising a means for successively applying to the post-synaptic bus the one or more addresses and the associated weights corresponding to the several memory registers.

7. The neuromorphic circuit as claimed in claim 6, wherein a first register of the elementary memory receives the event signal arising from the respective neuron to apply content of said first register to the post-synaptic bus, and produces a read signal which is itself applied to a second register for applying content of the second register to the post-synaptic bus, the second register emitting a read signal to the next register until a last register of the elementary memory has been used.

8. The neuromorphic circuit as claimed in claim 7, wherein the elementary memory comprises means for assigning a variable and programmable number of registers to a neuron, each register comprising a configurable programmable bit determining whether an extraction of a content of the register should be activated by the event signal from the respective neuron or by a read signal from an immediately upstream register.

9. The neuromorphic circuit as claimed in claim 8, wherein the registers of a column of elementary memories corresponding to a column of associated neurons are connected in cascade in such a way that an arbitrary register can receive a read signal from a register situated immediately upstream even if the register situated upstream does not form part of the same elementary memory.

10. The neuromorphic circuit as claimed in claim 9, wherein an arbitrary register is controlled by a programmable selection circuit to receive and select either the event signal arising directly from the neuron associated with the elementary memory corresponding to the arbitrary register, a read signal arising from a previous register corresponding to the same elementary memory, or a read signal arising from the previous register corresponding to another elementary memory linked to another neuron.

11. The neuromorphic circuit as claimed in claim 2, wherein the elementary memory is juxtaposed with the respective neuron in the network of discharge neurons.

12. The neuromorphic circuit as claimed in claim 2, wherein the elementary memory is situated above the respective neuron.

13. The neuromorphic circuit as claimed in claim 12, wherein the network of discharge neurons is situated on a first integrated circuit and the memory is situated on a second integrated circuit placed above the first integrated circuit, the elementary memory being linked to the respective neuron by a respective contact between the first integrated circuit and the second integrated circuit.

14. The neuromorphic circuit as claimed in claim 2, wherein the elementary memory comprises several memory registers, each memory register having the one of the one or more addresses and the associated weights, and comprising a means for successively applying to the post-synaptic bus the one of the one or more addresses and the associated weights corresponding to the several memory registers.

15. The neuromorphic circuit as claimed in claim 3, wherein the elementary memory comprises several memory registers, each memory register having the one of the one or more addresses and the associated weights, and comprising a means for applying to the post-synaptic bus successively the one of the one or more addresses and the associated weights corresponding to the several memory registers.

16. The neuromorphic circuit as claimed in claim 4, wherein the elementary memory comprises several memory registers, each memory register having the one of the one or more and the associated weights, and comprising a means for successively applying to the post-synaptic bus the one of the one or more addresses and the associated weights corresponding to the several memory registers.

17. The neuromorphic circuit as claimed in claim 5, wherein the elementary memory comprises several memory registers, each memory register having the one of the one or more addresses and the associated weights, and comprising a means for successively applying to the post-synaptic bus the one of the one or more addresses and the associated weights corresponding to the several memory registers.

* * * * *